(12) United States Patent
Ireland et al.

(10) Patent No.: US 11,704,671 B2
(45) Date of Patent: Jul. 18, 2023

(54) FINANCIAL MESSAGING TRANSFORMATION-AS-A-SERVICE

(71) Applicant: Bottomline Technologies Limited, Reading (GB)

(72) Inventors: Edward Ireland, Towchester (GB); Andy Turner, Royston (GB); Ludovic Pourrat, Annecy (FR)

(73) Assignee: Bottomline Technologies Limited, Reading (GB)

(*) Notice: Subject to any disclaimer, the term of this patent is extended or adjusted under 35 U.S.C. 154(b) by 50 days.

(21) Appl. No.: 16/838,297

(22) Filed: Apr. 2, 2020

(65) Prior Publication Data
US 2021/0312454 A1   Oct. 7, 2021

(51) Int. Cl.
*G06Q 20/00* (2012.01)
*G06Q 20/40* (2012.01)
*G06Q 20/38* (2012.01)

(52) U.S. Cl.
CPC ....... *G06Q 20/4016* (2013.01); *G06Q 20/386* (2020.05)

(58) Field of Classification Search
CPC ................ G06Q 20/4016; G06Q 20/3224
USPC ......................................................... 705/44
See application file for complete search history.

(56) References Cited

U.S. PATENT DOCUMENTS

| | | | |
|---|---|---|---|
| 3,573,747 A | 4/1971 | Adams et al. | |
| 3,688,276 A | 8/1972 | Quinn | |
| 4,186,438 A | 1/1980 | Benson et al. | |
| 4,346,442 A | 8/1982 | Musmanno | |
| 4,376,978 A | 3/1983 | Musmanno | |
| 4,449,186 A | 5/1984 | Kelly et al. | |
| 4,484,304 A | 11/1984 | Anderson et al. | |
| 4,604,686 A | 8/1986 | Reiter et al. | |
| 4,674,044 A | 6/1987 | Kalmus et al. | |
| 4,677,552 A | 6/1987 | Sibley, Jr. | |
| 4,694,397 A | 9/1987 | Grant et al. | |
| 4,713,761 A | 12/1987 | Sharpe et al. | |
| 4,759,063 A | 7/1988 | Chaum | |
| 4,759,064 A | 7/1988 | Chaum | |
| 4,799,156 A | 1/1989 | Shavit et al. | |

(Continued)

FOREIGN PATENT DOCUMENTS

| CA | 2191640 A1 | 5/1998 |
|---|---|---|
| GB | 1489572 A | 10/1977 |

(Continued)

OTHER PUBLICATIONS

Financial Transaction Manager Technical Overview : An IBM Redbooks publication; Published Mar. 21, 2014 (Year: 2014).*

(Continued)

*Primary Examiner* — Bruce I Ebersman
*Assistant Examiner* — Hatem M Ali
(74) *Attorney, Agent, or Firm* — Richard A Baker, Jr.

(57) ABSTRACT

A transformation-as-a-service apparatus, system and method are described, where the transformation converts financial messages from one format to another (such as SWIFT format to ISO 20022 format, etc), storing the original and transformed messages for future access by a token. The transformation service also includes a permissions and access control mechanism for allowing access to the financial messages based on requestor permissions when requested via the token.

15 Claims, 5 Drawing Sheets

(56) References Cited

U.S. PATENT DOCUMENTS

| | | |
|---|---|---|
| 4,823,264 A | 4/1989 | Deming |
| 4,868,877 A | 9/1989 | Fischer |
| 4,914,698 A | 4/1990 | Chaum |
| 4,926,480 A | 5/1990 | Chaum |
| 4,947,430 A | 8/1990 | Chaum |
| 4,949,380 A | 8/1990 | Chaum |
| 4,979,206 A | 12/1990 | Padden et al. |
| 4,987,593 A | 1/1991 | Chaum |
| 4,991,210 A | 2/1991 | Chaum |
| 4,996,711 A | 2/1991 | Chaum |
| 5,007,084 A | 4/1991 | Materna et al. |
| 5,111,395 A | 5/1992 | Smith et al. |
| 5,121,945 A | 6/1992 | Thomson et al. |
| 5,122,959 A | 6/1992 | Nathanson et al. |
| 5,131,039 A | 7/1992 | Chaum |
| 5,220,501 A | 6/1993 | Lawlor et al. |
| 5,222,018 A | 6/1993 | Sharpe et al. |
| 5,225,978 A | 7/1993 | Petersen et al. |
| 5,276,736 A | 1/1994 | Chaum |
| 5,283,829 A | 2/1994 | Anderson |
| 5,287,270 A | 2/1994 | Hardy et al. |
| 5,295,256 A | 3/1994 | Bapat |
| 5,326,959 A | 7/1994 | Perazza |
| 5,339,392 A | 8/1994 | Risberg et al. |
| 5,367,624 A | 11/1994 | Cooper |
| 5,373,558 A | 12/1994 | Chaum |
| 5,383,113 A | 1/1995 | Kight et al. |
| 5,424,938 A | 6/1995 | Wagner et al. |
| 5,440,744 A | 8/1995 | Jacobson et al. |
| 5,465,206 A | 11/1995 | Hilt et al. |
| 5,483,445 A | 1/1996 | Pickering |
| 5,544,320 A | 8/1996 | Konrad |
| 5,619,710 A | 4/1997 | Travis et al. |
| 5,649,117 A | 7/1997 | Landry |
| 5,659,616 A | 8/1997 | Sudia |
| 5,668,953 A | 9/1997 | Sloo |
| 5,677,955 A | 10/1997 | Doggett et al. |
| 5,689,565 A | 11/1997 | Spies et al. |
| 5,694,551 A | 12/1997 | Doyle et al. |
| 5,696,901 A | 12/1997 | Konrad |
| 5,699,528 A | 12/1997 | Hogan |
| 5,710,887 A | 1/1998 | Chelliah et al. |
| 5,712,789 A | 1/1998 | Radican |
| 5,727,249 A | 3/1998 | Pollin |
| 5,745,755 A | 4/1998 | Covey |
| 5,772,585 A | 6/1998 | Lavin et al. |
| 5,794,212 A | 8/1998 | Mistr, Jr. |
| 5,794,221 A | 8/1998 | Egendorf |
| 5,832,460 A | 11/1998 | Bednar et al. |
| 5,842,185 A | 11/1998 | Chancey et al. |
| 5,845,283 A | 12/1998 | Williams et al. |
| 5,848,400 A | 12/1998 | Chang |
| 5,852,722 A | 12/1998 | Hamilton |
| 5,860,068 A | 1/1999 | Cook |
| 5,862,325 A | 1/1999 | Reed et al. |
| 5,864,827 A | 1/1999 | Wilson |
| 5,873,072 A | 2/1999 | Kight et al. |
| 5,878,419 A | 3/1999 | Carter |
| 5,884,288 A | 3/1999 | Chang et al. |
| 5,884,325 A | 3/1999 | Bauer et al. |
| 5,893,076 A | 4/1999 | Hafner et al. |
| 5,893,080 A | 4/1999 | McGurl et al. |
| 5,895,450 A | 4/1999 | Sloo |
| 5,897,645 A | 4/1999 | Watters |
| 5,899,982 A | 5/1999 | Randle |
| 5,910,896 A | 6/1999 | Hahn-Carlson |
| 5,918,217 A | 6/1999 | Maggioncalda et al. |
| 5,920,847 A | 7/1999 | Kolling et al. |
| 5,943,656 A | 8/1999 | Crooks et al. |
| 5,953,706 A | 9/1999 | Patel |
| 5,956,688 A | 9/1999 | Kokubo et al. |
| 5,956,700 A | 9/1999 | Landry |
| 5,963,925 A | 10/1999 | Kolling et al. |
| 5,966,531 A | 10/1999 | Skeen et al. |
| 5,970,475 A | 10/1999 | Barnes et al. |
| 5,970,482 A | 10/1999 | Pham et al. |
| 5,978,780 A | 11/1999 | Watson |
| 5,999,937 A | 12/1999 | Ellard |
| 6,032,132 A | 2/2000 | Nelson |
| 6,032,133 A | 2/2000 | Hilt et al. |
| 6,035,285 A | 3/2000 | Schlect et al. |
| 6,041,312 A | 3/2000 | Bickerton et al. |
| 6,044,362 A | 3/2000 | Neely |
| 6,049,799 A | 4/2000 | Mangat et al. |
| 6,052,671 A | 4/2000 | Crooks et al. |
| 6,052,674 A | 4/2000 | Zervides et al. |
| 6,052,785 A | 4/2000 | Lin et al. |
| 6,058,380 A | 5/2000 | Anderson et al. |
| 6,061,449 A | 5/2000 | Candelore et al. |
| 6,070,150 A | 5/2000 | Remington et al. |
| 6,078,907 A | 6/2000 | Lamm |
| 6,081,790 A | 6/2000 | Rosen |
| 6,104,798 A | 8/2000 | Lickiss et al. |
| 6,128,603 A | 10/2000 | Dent et al. |
| 6,154,748 A | 11/2000 | Gupta et al. |
| 6,173,272 B1 | 1/2001 | Thomas et al. |
| 6,189,003 B1 | 2/2001 | Leal |
| 6,202,066 B1 | 3/2001 | Barkley et al. |
| 6,216,173 B1 | 4/2001 | Jones et al. |
| 6,219,790 B1 | 4/2001 | Lloyd et al. |
| 6,233,565 B1 | 5/2001 | Lewis et al. |
| 6,256,676 B1 | 7/2001 | Taylor et al. |
| 6,289,322 B1 | 9/2001 | Kitchen et al. |
| 6,317,745 B1 | 11/2001 | Thomas et al. |
| 6,327,578 B1 | 12/2001 | Linehan |
| 6,330,551 B1 | 12/2001 | Burchetta et al. |
| 6,330,563 B1 | 12/2001 | Heckerman et al. |
| 6,332,163 B1 | 12/2001 | Bowman-Amuah |
| 6,360,211 B1 | 3/2002 | Anderson et al. |
| 6,360,223 B1 | 3/2002 | Ng et al. |
| 6,408,292 B1 | 6/2002 | Bakalash et al. |
| 6,418,416 B1 | 7/2002 | Rosenberg et al. |
| 6,438,527 B1 | 8/2002 | Powar |
| 6,453,352 B1 | 9/2002 | Wagner et al. |
| 6,470,321 B1 | 10/2002 | Cumming et al. |
| 6,490,718 B1 | 12/2002 | Watters |
| 6,519,612 B1 | 2/2003 | Howard et al. |
| 6,523,016 B1 | 2/2003 | Michalski |
| 6,578,015 B1 | 6/2003 | Haseltine et al. |
| 6,594,692 B1 | 7/2003 | Reisman |
| 6,609,114 B1 | 8/2003 | Gressel et al. |
| 6,609,200 B2 | 8/2003 | Anderson et al. |
| 6,622,128 B1 | 9/2003 | Bedell et al. |
| 6,625,597 B1 | 9/2003 | Yazdani |
| 6,629,081 B1 | 9/2003 | Cornelius et al. |
| 6,631,008 B2 | 10/2003 | Aoki |
| 6,640,244 B1 | 10/2003 | Bowman-Amuah |
| 6,675,164 B2 | 1/2004 | Kamath et al. |
| 6,687,693 B2 | 2/2004 | Cereghini et al. |
| 6,694,308 B2 | 2/2004 | Tremblay |
| 6,708,163 B1 | 3/2004 | Kargupta et al. |
| 6,745,229 B1 | 6/2004 | Gobin et al. |
| 6,757,710 B2 | 6/2004 | Reed |
| 6,766,307 B1 | 7/2004 | Israel et al. |
| 6,820,199 B2 | 11/2004 | Wheeler et al. |
| 6,826,542 B1 | 11/2004 | Virgin et al. |
| 6,850,893 B2 | 2/2005 | Lipkin et al. |
| 6,856,970 B1 | 2/2005 | Campbell et al. |
| 6,868,413 B1 | 3/2005 | Grindrod et al. |
| 6,882,986 B1 | 4/2005 | Heinemann et al. |
| 6,883,004 B2 | 4/2005 | Bahl et al. |
| 6,889,325 B1 | 5/2005 | Sipman et al. |
| 6,915,430 B2 | 7/2005 | Wheeler et al. |
| 6,952,737 B1 | 10/2005 | Coates et al. |
| 6,954,632 B2 | 10/2005 | Kobayashi |
| 6,961,849 B1 | 11/2005 | Davis et al. |
| 6,963,843 B1 | 11/2005 | Takatsu et al. |
| 7,003,781 B1 | 2/2006 | Blackwell et al. |
| 7,024,395 B1 | 4/2006 | McCown et al. |
| 7,039,605 B2 | 5/2006 | Kuwahara et al. |
| 7,068,641 B1 | 6/2006 | Allan et al. |
| 7,085,840 B2 | 8/2006 | De et al. |
| 7,092,941 B1 | 8/2006 | Campos |
| 7,133,845 B1 | 11/2006 | Ginter et al. |

(56) References Cited

U.S. PATENT DOCUMENTS

| | | |
|---|---|---|
| 7,200,149 B1 | 4/2007 | Hasty, Jr. |
| 7,233,997 B1 | 6/2007 | Leveridge et al. |
| 7,284,036 B2 | 10/2007 | Ramaswamy |
| 7,308,436 B2 | 12/2007 | Bala et al. |
| 7,502,754 B2 | 3/2009 | Campbell et al. |
| 7,536,435 B2 | 5/2009 | Campbell et al. |
| 7,565,422 B2 | 7/2009 | Campbell et al. |
| 7,568,219 B2 | 7/2009 | Campbell et al. |
| 7,584,277 B2 | 9/2009 | Campbell et al. |
| 7,603,431 B2 | 10/2009 | Campbell et al. |
| 7,624,068 B1 | 11/2009 | Heasley et al. |
| 7,716,590 B1 | 5/2010 | Nathan |
| 7,882,028 B1 | 2/2011 | Devine et al. |
| 8,046,336 B1 | 10/2011 | Zhang et al. |
| 8,108,274 B2 | 1/2012 | Johnston et al. |
| 8,122,490 B2 | 2/2012 | Campbell et al. |
| 8,229,875 B2 | 7/2012 | Roychowdhury |
| 8,229,876 B2 | 7/2012 | Roychowdhury |
| 8,266,115 B1 | 9/2012 | Park et al. |
| 8,317,090 B2 | 11/2012 | Wiesman et al. |
| 8,401,867 B2 | 3/2013 | Lagadec et al. |
| 8,521,646 B2 | 8/2013 | Hoke et al. |
| 9,003,312 B1 | 4/2015 | Ewe |
| 9,299,241 B1 | 3/2016 | Monical et al. |
| 9,489,627 B2 | 11/2016 | Bala |
| 9,929,988 B2 | 3/2018 | Gil et al. |
| 9,946,995 B2 | 4/2018 | Dwyer |
| 10,142,267 B2 | 11/2018 | Gil et al. |
| 2001/0034675 A1 | 10/2001 | Belford et al. |
| 2001/0051919 A1 | 12/2001 | Mason |
| 2001/0056362 A1 | 12/2001 | Hanagan et al. |
| 2002/0010684 A1 | 1/2002 | Moskowitz |
| 2002/0016769 A1 | 2/2002 | Barbara et al. |
| 2002/0016910 A1 | 2/2002 | Wright et al. |
| 2002/0046335 A1 | 4/2002 | Baum-Waidner |
| 2002/0059113 A1 | 5/2002 | Bahl et al. |
| 2002/0077977 A1 | 6/2002 | Neely et al. |
| 2002/0082990 A1 | 6/2002 | Jones |
| 2002/0107819 A1 | 8/2002 | Ouimet |
| 2002/0111886 A1 | 8/2002 | Chenevich et al. |
| 2002/0124137 A1 | 9/2002 | Ulrich et al. |
| 2002/0135614 A1 | 9/2002 | Bennett |
| 2002/0143699 A1 | 10/2002 | Baumann et al. |
| 2002/0143701 A1 | 10/2002 | Maguire et al. |
| 2002/0169743 A1 | 11/2002 | Arnold et al. |
| 2002/0178117 A1 | 11/2002 | Maguire et al. |
| 2002/0184054 A1 | 12/2002 | Cox et al. |
| 2002/0184123 A1 | 12/2002 | Sijacic et al. |
| 2002/0184349 A1 | 12/2002 | Manukyan |
| 2002/0188619 A1 | 12/2002 | Low |
| 2002/0191311 A1 | 12/2002 | Ulrich et al. |
| 2002/0198798 A1 | 12/2002 | Ludwig et al. |
| 2002/0198828 A1 | 12/2002 | Ludwig et al. |
| 2002/0198829 A1 | 12/2002 | Ludwig et al. |
| 2003/0004874 A1 | 1/2003 | Ludwig et al. |
| 2003/0041042 A1 | 2/2003 | Cohen et al. |
| 2003/0046225 A1 | 3/2003 | Yamaguchi et al. |
| 2003/0101446 A1 | 5/2003 | McManus et al. |
| 2003/0110103 A1 | 6/2003 | Sesek et al. |
| 2003/0130921 A1 | 7/2003 | Force et al. |
| 2003/0130942 A1 | 7/2003 | Campbell et al. |
| 2003/0130943 A1 | 7/2003 | Campbell et al. |
| 2003/0130944 A1 | 7/2003 | Force et al. |
| 2003/0130945 A1 | 7/2003 | Force et al. |
| 2003/0167229 A1 | 9/2003 | Ludwig et al. |
| 2003/0184590 A1 | 10/2003 | Will |
| 2003/0191709 A1 | 10/2003 | Elston et al. |
| 2003/0208684 A1 | 11/2003 | Camacho et al. |
| 2003/0217150 A1 | 11/2003 | Roese et al. |
| 2003/0220855 A1 | 11/2003 | Lam et al. |
| 2003/0233305 A1 | 12/2003 | Solomon |
| 2004/0034666 A1 | 2/2004 | Chen |
| 2004/0044603 A1 | 3/2004 | Gordon-Ervin et al. |
| 2004/0064389 A1 | 4/2004 | Force et al. |
| 2004/0230797 A1 | 11/2004 | Ofek et al. |
| 2005/0108157 A1 | 5/2005 | Bushman et al. |
| 2005/0138110 A1 | 6/2005 | Redlich et al. |
| 2005/0138186 A1 | 6/2005 | Hesselink et al. |
| 2005/0154692 A1 | 7/2005 | Jacobsen et al. |
| 2005/0177495 A1 | 8/2005 | Crosson Smith |
| 2005/0177504 A1 | 8/2005 | Crosson Smith |
| 2005/0177521 A1 | 8/2005 | Crosson Smith |
| 2005/0192896 A1 | 9/2005 | Hutchison et al. |
| 2006/0015822 A1 | 1/2006 | Baig |
| 2006/0031407 A1 | 2/2006 | Dispensa et al. |
| 2006/0059087 A1 | 3/2006 | Smith et al. |
| 2006/0080245 A1 | 4/2006 | Bahl |
| 2006/0089890 A1 | 4/2006 | Campbell |
| 2006/0095372 A1 | 5/2006 | Venkatasubramanian et al. |
| 2006/0101048 A1 | 5/2006 | Mazzagatti et al. |
| 2006/0168023 A1 | 7/2006 | Srinivasan et al. |
| 2006/0190310 A1 | 8/2006 | Gudla et al. |
| 2006/0190380 A1 | 8/2006 | Force et al. |
| 2006/0200767 A1 | 9/2006 | Glaske |
| 2006/0265662 A1 | 11/2006 | Gertzen |
| 2007/0005613 A1* | 1/2007 | Singh .................... G06Q 30/06 |
| 2007/0055672 A1 | 3/2007 | Stevens |
| 2007/0266176 A1 | 11/2007 | Wu |
| 2007/0295803 A1 | 12/2007 | Levine et al. |
| 2008/0104007 A1 | 5/2008 | Bala |
| 2008/0186853 A1 | 8/2008 | Archer et al. |
| 2008/0262919 A1 | 10/2008 | Ang et al. |
| 2009/0083181 A1 | 3/2009 | Bishop et al. |
| 2009/0089194 A1 | 4/2009 | Mathis et al. |
| 2009/0150814 A1 | 6/2009 | Eyer |
| 2009/0271862 A1 | 10/2009 | Allen et al. |
| 2009/0276306 A1 | 11/2009 | Hicks |
| 2009/0307176 A1 | 12/2009 | Jeong et al. |
| 2010/0066540 A1 | 3/2010 | Theobald et al. |
| 2010/0106589 A1 | 4/2010 | Etheredge et al. |
| 2010/0169234 A1 | 7/2010 | Metzger et al. |
| 2010/0211499 A1 | 8/2010 | Zanzot et al. |
| 2010/0274714 A1 | 10/2010 | Sims et al. |
| 2011/0038254 A1 | 2/2011 | Hashiguchi et al. |
| 2011/0302485 A1 | 12/2011 | D'Angelo et al. |
| 2012/0041683 A1 | 2/2012 | Vaske et al. |
| 2012/0054095 A1 | 3/2012 | Lesandro |
| 2012/0078701 A1 | 3/2012 | Woods |
| 2012/0149405 A1 | 6/2012 | Bhat |
| 2012/0150568 A1 | 6/2012 | Greener et al. |
| 2012/0158566 A1 | 6/2012 | Fok et al. |
| 2012/0197795 A1 | 8/2012 | Campbell |
| 2012/0278898 A1 | 11/2012 | Nguyen et al. |
| 2012/0290379 A1 | 11/2012 | Hoke et al. |
| 2012/0290381 A1 | 11/2012 | Martin et al. |
| 2012/0290382 A1 | 11/2012 | Martin |
| 2012/0290400 A1 | 11/2012 | Hoke et al. |
| 2012/0290471 A1 | 11/2012 | Hoke |
| 2012/0290474 A1 | 11/2012 | Hoke |
| 2012/0290479 A1 | 11/2012 | Hoke |
| 2012/0330805 A1 | 12/2012 | Eberle et al. |
| 2013/0024303 A1 | 1/2013 | Stollery |
| 2013/0071816 A1 | 3/2013 | Singh et al. |
| 2013/0119125 A1* | 5/2013 | Drummond .............. G06Q 40/00 235/379 |
| 2013/0144782 A1 | 6/2013 | Eberle et al. |
| 2013/0231974 A1 | 9/2013 | Harris et al. |
| 2013/0311420 A1 | 11/2013 | Tehranchi et al. |
| 2013/0317985 A1 | 11/2013 | Hoke et al. |
| 2013/0346521 A1 | 12/2013 | Arabo et al. |
| 2014/0171135 A1 | 6/2014 | Fan et al. |
| 2014/0241173 A1 | 8/2014 | Knight |
| 2014/0241609 A1 | 8/2014 | Vigue |
| 2014/0244491 A1 | 8/2014 | Eberle |
| 2014/0258104 A1 | 9/2014 | Harnisch |
| 2014/0279484 A1 | 9/2014 | Dwyer |
| 2014/0344046 A1 | 11/2014 | Martin et al. |
| 2015/0066729 A1 | 3/2015 | Hu et al. |
| 2015/0088783 A1 | 3/2015 | Mun |
| 2015/0120536 A1* | 4/2015 | Talker .................... G06Q 20/02 705/39 |
| 2015/0317589 A1 | 11/2015 | Anderson et al. |
| 2015/0339765 A1 | 11/2015 | Dubey et al. |
| 2015/0348067 A1 | 12/2015 | Deegan et al. |

(56) References Cited

U.S. PATENT DOCUMENTS

| | | | |
|---|---|---|---|
| 2016/0034900 A1* | 2/2016 | Nelsen | G06Q 20/4016 |
| | | | 705/44 |
| 2017/0178229 A1 | 6/2017 | Koh | |
| 2017/0289106 A1 | 10/2017 | Chen et al. | |
| 2018/0158146 A1 | 6/2018 | Turner et al. | |
| 2020/0242483 A1 | 7/2020 | Shashikant et al. | |
| 2020/0279198 A1 | 9/2020 | Turner et al. | |
| 2020/0349639 A1* | 11/2020 | Mousseau | G06Q 20/04 |
| 2020/0366754 A1* | 11/2020 | Wang | H04L 9/3247 |
| 2020/0410410 A1 | 12/2020 | Tripathi et al. | |
| 2021/0142399 A1 | 5/2021 | Joliveau | |

FOREIGN PATENT DOCUMENTS

| | | | |
|---|---|---|---|
| WO | 98/58339 A1 | 12/1998 | |
| WO | 99/28843 A2 | 6/1999 | |
| WO | 00/46725 A1 | 8/2000 | |
| WO | 01/41020 A1 | 6/2001 | |
| WO | WO-2014111540 A1 * | 7/2014 | G06F 17/30312 |
| WO | WO-2017027900 A1 * | 2/2017 | G06F 21/64 |
| WO | WO-2017218013 A1 * | 12/2017 | H04L 12/4641 |

OTHER PUBLICATIONS

IEEE Xplore: IEEE Standard for a High-Performance Serial Bus: ISBN (Electronic): 978-0-7381-5770-2; Last Update Date: Dec. 8, 2008; Publication Date: Oct. 21, 2008. (Year: 2008).*

IEEE Xplore: IEEE Standard for a High-Performance Serial Bus: ISBN (Electronic): 978-0-7381-5770-2; Last Update Date: Dec. 8, 2008; Publication Date: Oct. 21, 2008. (Year: 2008) (Year: 2008).*

Financial Transaction Manager Technical Overview : An IBM Redbooks publication; Published Mar. 21, 2014; Publication Date: Oct. 21, 2008. (Year: 2008) (Year: 2014) (Year: 2014).*

IEEE Xplore: IEEE Standard for a High-Performance Serial Bus: ISBN (Electronic): 978-0-7381-5770-2; Last Update Date: Dec. 8, 2008; Publication Date: Oct. 21, 2008. (Year: 2008) (Year: 2008) (Year: 2008).*

Financial Transaction Manager Technical Overview : An IBM Redbooks publication; Published Mar. 21, 2014; Publication Date: Oct. 21, 2008. (Year: 2008) (Year: 2014) (Year: 2014) (Year: 2014).*

Financial Transaction Manager Technical Overview: An IBM Redbooks publication; Published Mar. 21, 2014; Publication date: Oct. 21, 2008(Year:2008) (Year: 2014).*

Author: Markus Jakobson ; Title: How things Work and Fail ; Pub: IEEE; Copyright Year: 2012 (Year: 2012).*

"Broadridge Communications Cloud for Retail Banks", Broadridge, webpage downloaded from https://www.broadridge.com/resource/broadridge-communications-cloud-for-retail-banks on Feb. 21, 2020.

"Message Transformation", AnaSys, a PDF document found at https://www.anasys.com/wp-content/uploads/2017/03/Message-Transformation-EN-for-Banks-and-Corporates.pdf on Feb. 21, 2020.

"Helping information move with money", identitii, web page downloaded on Mar. 20, 2020 from https://identitii.com/.

"ISO 20022 Migration and Modernization", Volante, web page downloaded on Mar. 20, 2020 from https://www.volantetech.com/iso-20022-migration.

"ISO 20022: Helping banks with transformation through faster onboarding and more accurate testing", XMLdation, web page download on Mar. 20, 2020 from https://www.xmldation.com/en/2017/iso-20022/.

"Key Decisions Required When Utilizing a Swift Service Bureau", Bottomline Technologies (de), Inc, 2015.

"Sterci rebrands service bureau as GT Cloud", Sterci, May 22, 2013.

"GTFrame, Business Flows Integration", Bottomline Technologies (de), Inc, 2015.

"Swift for Corporates:Making the Business Case", Bottomline Technologies (de), Inc., 2014.

Academic Press Dictionary of Science and Technology (1992), retrieved from xreferplus.com, defining data structure.

Academic Press Dictionary of Science and Technology (1992), retrieved from xreferplus.com, defining parameter.

An Overview of Electronic Bill Presentment and Payment Operatin Models, prepared by the Business Practices Task Force of NACHA's Council for Electronic Billing and Payment, Apr. 9, 1999, pp. 1-12.

Bansal, Nikhil, Avrim Blum, and Shuchi Chawla. "Correlation clustering." Machine Learning 56.1-3 (2004): 89-113.

C3 CRM, "Next Generation CRM Designed for AI/Machine Learning", webpage found at https://c3.ai/products/c3-crm/on Oct. 21, 2019.

Dictionary of multimedia and Internet Applications (1999), retrieved from xreferplus.com, defining Relational Database.

Distributed Mining of Classification Rules , By Cho and Wuthrich, 2002 http://www.springerlink.com/21nnasudlakyzciv54i5kxz0)/app/home/contribution.asp?referrer=parent&backto=issue,1,6;journal,2,3,31;linkingpublicationresults,1:105441,1.

Finastra, "Fusion Cash Management: Cash Flow Forecasting Module", Mar. 2018.

Finley, Thomas, and Thorsten Joachims. "Supervised clustering with support vector machines." Proceedings of the 22nd international conference on Machine learning, ACM, 2005.

Hua, et al., "A Brief Review of Machine Learning and its Application", 2009, Information Engineering Institute Capital Normal University, entire document pertinent (Year: 2009).

IGTB, "iGTB Finovate 2019 Demo of CBX", YouTube video, Feb. 27, 2019, video localed at https://www.youtube.com/watch?v=U0_r74N51nc.

Intellect Design Arena, "Trus Contextual Banking Experience Delivered", YouTube video, Oct. 13, 2017, video located at https://www.youtube.com/watch?v=CAQSqmNhDEA.

Jhingran, Ananl, "Moving toward outcome-based intelligence", IDG Contributor Network, Mar. 19, 2018.

Joliveau, Edouard, "Payment & Cash Management 4.2: Solution Description", Bottomline Technologies, Mar. 29, 2018.

Knudson, Scott E.; Walton, Jack K., III; Young, Florence M.; Business-to Business Payments and the Role of Financial Electronic Data Interchange, Federal Reserve Bulletin, Apr. 1994, pp. 269-278.

Madura, "International Financial Management", Abridged 8/e, Chapter 21, Mason, OH:Thompson South-Western, 2007.

Masich, Jeffrey L., Improving Cash Flow and Streamlining Operations Through EDI, Journal of Cash Management, Jan./Feb. 1991, pp. 13-16.

Meia et al., Comparing clusterings—an information based distance, Journal of Multivariate Analysis 98 (2007) 873-895.

Mooney, James E., Getting Started in EDI: Chevron's approach, Journal of Cash Mangement, NCC MA Conference 1991, pp. 69-74.

Mosele Lonnie E.; Boodey, David M., Mastering Microsoft Office 97, Professional Edition, Second Edition, 1997, pp. 1123/1124.

Patil et al., "Out of Order Floating Point Coprocessor For RISC V ISA", 2015, Centre for Development of Advanced Computing, Bangalore, India (Year: 2015).

Penguin International Dictionary of Finance (1999), retrieved from xreferplus.com, defining on-line.

Roget's II: The New Thesaurus (1995), retrieved from xreferplus.com, defining invoice and fee.

Secure File Transfer While You Sleep—No Longer Just a Dream; New VanDyke Release Makes Unattended Secure File Transfers a Reality, PR Newswire. New York: Dec. 20, 2001. p. 1.

Treleaven, et al., Computational Finance, published in IEEE Computer (vol. 43 , Issue: 12 , Dec. 2010 ), entire document pertinent (Year: 2010).

TurboTax for Windows User's Guide (1997).

Wikipedia, "Autoregressive integrated moving average", Oct. 7, 2019, webpage downloaded from https://en.wikipedia.org/wiki/Autoregressive_integrated_moving_average on Nov. 7, 2019.

* cited by examiner

FINANCIAL MESSAGING TRANSFORMATION-AS-A-SERVICE

PRIOR APPLICATION

This application is a priority non-provisional patent application.

BACKGROUND

Technical Field

The system and methods described herein generally relate to financial messaging, and, in particular, to the transformation of financial messages as a service.

Description of the Related Art

All electronic banking is performed with financial messages sent over a banking rail between banks, and between banks and their customers. There are a number of standards that are used to format these financial messages, depending upon the source and destination of the financial message. SWIFT has one standard for wire transfers, ACH is another standard, Real Time Payments (RTP) is a third, and ISO 20022 is still another financial message standard. In some cases, an application may always create one type of message, regardless of where the message may need to go. In another case, financial messages from one banking rail need to be routed to another rail, requiring that the financial message be transformed. The financial message transformation allows banks and corporations to transform, enrich and validate any financial message. This transformation is particularly important as the world's banks convert from SWIFT format to ISO 20022 message formats.

The message transformation uses configurable transformation rules, which combine input and output messages. With these rules new message formats are generated using predefined output message templates. Boolean logic links the correct conversion rule and message template. The linking itself depends on customer, message source and application and is applied on the content of the message to be converted.

Fields of output messages can be filled both by transformation of incoming data and by look-up into static reference data. In particular, the message transformation service also makes it possible to enrich the output message as a function of an earlier input message and transformation. Enrichment can also be performed via an API call to an additional data source. A transformed message can be extended to include additional required content from an additional data source for which the customer provides the Service permission to access.

Traditional transformations are performed locally on the computers of the message sender. The sender buys a software package to do the transformation that is needed. However, this transformation methodology allows only a limited transformation based on what was purchased and installed. Upgrades are difficult, as each computer with the transformation software must be updated.

A vast improvement over traditional shrink-wrap transformation software is to perform transformations as a service, installed on a server and accessible over a network to a small number of locations. Using transformation-as-a-service, a broad range of transformations is possible from the service, and updates can be made for all users quickly and completely. Core transformation libraries are referenced as a default. In addition, a customer can create their own modified transformations to be referenced or upload entirely new mappings to be performed by the service for them. Furthermore, a transformation-as-a-service model allows for metering usage in a central location for monitoring usage and billing purposes. With a transformation-as-a-service model, a customer can only pay for the transformations that are used, rather than paying a large amount for transformation software that is rarely used. For smaller financial institution, this can be a significant costs savings, or can determine whether a service, such as wire transfers, are offered at all.

Furthermore, transformation-as-a-service allows financial messages to be stored on the transformation server, with a token returned to the message. This improves security of the messages and permits partial access, with the token and a permissions scheme, so that some requestors can receive only part of the message to perform specific functions. For instance, a bank could create a message in SWIFT format, send it to the transformation server, which returns a token. The token could be sent to a fraud detection server, who requests the message from the transformation server, only receiving the sender and receiver information. By limiting the information flowing around the network, the security and privacy of the financial messages are improved.

BRIEF SUMMARY OF THE INVENTION

A system for processing financial messages is described herein. The system is made up of a financial institution, a fraud monitor, and a special purpose transformation-as-a-service server. The financial institution is electrically connected to a cloud. The financial institution creates and sends a financial message to a special purpose transformation-as-a-service server via the cloud.

The fraud monitor is electrically connected to the cloud. The fraud monitor accepts a message from the cloud, checks the message for fraudulent activity, and returns an indication of fraud.

The special purpose transformation-as-a-service server is made up of a plurality of processing cores electrically connected together, and electrically connected to a data storage device and a network interface (that is also electrically connected to the cloud). The special purpose transformation-as-a-service server is accessible to the financial institution and the fraud monitor through the cloud. The plurality of processing cores accept the financial message from the financial institution, store the financial message in the data storage device, transform the financial message into a transformed message using a mappings library, store the transformed message in the data storage device, generate a token related to the transformed message and the financial message, and return the token and the transformed message to the financial institution.

The financial institution sends the token to the fraud monitor, and the fraud monitor, sends the token to the special purpose transformation-as-a-service server, and the special purpose transformation-as-a-service server returns a portion of the transformed message to the fraud monitor which evaluates the portion of the transformed message and returns the indication of fraud to the financial institution.

In some embodiments, the system also includes a sanctions monitor electrically connected to the cloud. The sanctions monitor accepts a sanctions message (containing the token) from the financial institution via the cloud, interrogates the special purpose transformation-as-a-service server for a portion of the transformed message, checks the portion of the transformed message for sanctioned activity, and returns a sanction indication to the financial institution.

In some embodiments, the system also includes an identity and access management module that runs on the plurality of processing cores. The identity and access management module intercepts the financial message as it arrives and determines if the financial institution has permission to perform a service requested in the financial message.

The financial message transformation could include using an additional database. The financial institution could be a bank. The financial message could be in SWIFT format. The transformed message could be in ISO 20022 format.

A special purpose transformation-as-a-service server is also described herein. The special purpose transformation-as-a-service server is made up of a plurality of processing cores electrically connected together, a data storage device electrically connected to the plurality of processing cores, and a network interface electrically connected to the plurality of processing cores and to a cloud. The special purpose transformation-as-a-service server is accessible to a financial institution, fraud monitor, and sanctions monitor through the cloud. The plurality of processing cores accept a financial message from the financial institution, store the financial message in the data storage device, transform the financial message into a transformed message using a mappings library, store the transformed message in the data storage device, generate a token related to the transformed message and the financial message, and returns the token and the transformed message to the financial institution.

The special purpose transformation-as-a-service server may further include an identity and access management module that executes on the plurality of processing cores. The identity and access management module intercepts the financial message as it arrives and determines if the financial institution has permission to perform a service requested in the financial message. In some cases, the plurality of processing cores accept a sanction message (including the token) from the sanction monitor via the cloud, interrogates the identity and access management module for access rights to portions of the transformed message, retrieves the portions of the transformed message, and returns the portions of the transformed message to the sanction monitor.

A method for transforming financial messages is also described herein. The method includes the steps of (1) receiving a financial message from a financial institution on a cloud, at a network interface electrically connected to the cloud and a plurality of processing cores, (2) storing the financial message in a data storage device electrically connected to the plurality of processing cores, (3) transforming the financial message into a transformed message using a mappings library, (4) storing the transformed message in the data storage device, (5) generating a token related to the transformed message and the financial message, and (6) returning the token and the transformed message to the financial institution.

The method could also include (1a) executing an identity and access management module on the plurality of processing cores, (1b) intercepting, by the identity and access management module, the financial message as it arrives, and (1c) determining if the financial institution has permission to perform a service requested in the financial message. In some instances, the method further includes the steps of (7) accepting, by the plurality of processing cores, a fraud monitor message (including the token) from the financial institution via the cloud, (8) interrogating the fraud monitor message, by the identity and access management module, for access rights to portions of the transformed message retrieving the portions of the transformed message, and (9) returning the portions of the transformed message.

DETAILED DESCRIPTION

As the world's banking systems convert from SWIFT messages to the ISO 20022 financial message format, and from other financial message formats, solutions are needed to facilitate the conversion, especially for smaller financial institutions. In addition, as messages need to be validated, scanned for fraud, and examiner for government sanctions activity, an improved system and methodology is needed to transform financial messages from older banking software to newer systems. The solution is to perform message transformations as a service, in the cloud, and to all the transform service to retain the message, so that portions of the message can be sent to the validation services, the sanctions services, and the fraud detection services.

Figure 1:
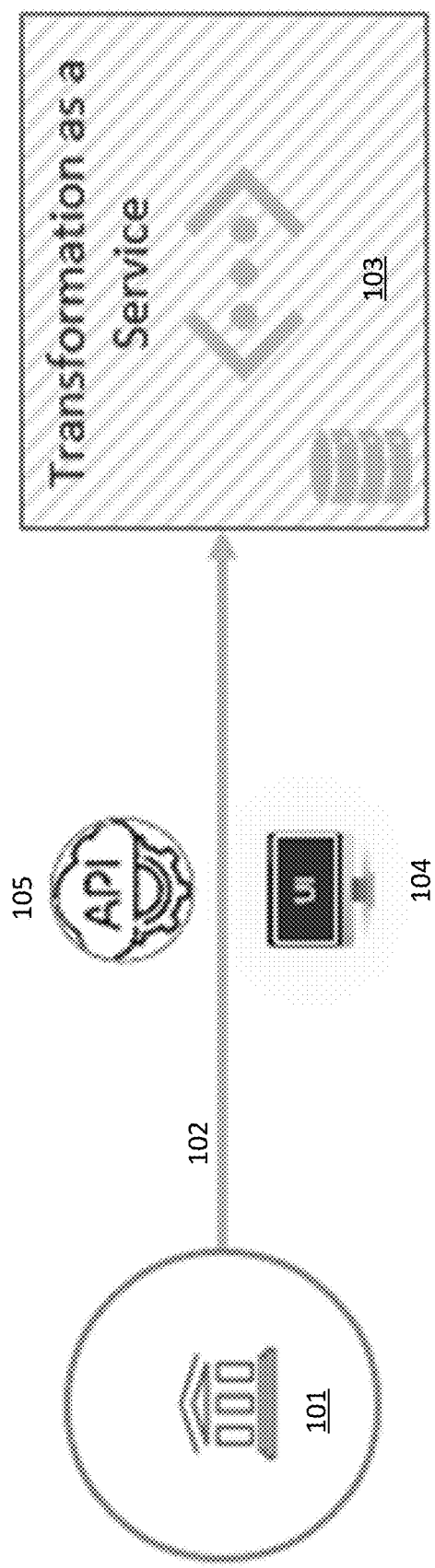
FIG. 1 is a diagram of the interfaces to the transformation-as-a-service.

Looking to FIG. 1, we see a financial institution 101 which could be a bank, a credit card company, an investment company, credit unions, stock brokers, consumer finance companies, insurance companies, some government organizations, foreign exchange companies, clearing houses, and the financial departments of some companies. The financial institution 101 wants to transfer money. It prepares a request for the money transfer either through a user interface 104 or through another software program through an application program interface 105 ("API"). The user interface 104 or the API 105 connect, over a network 102 to the transformation-as-a-service cloud based application 103 ("TaaS"). The TaaS 103 accepts messages in a number of financial message formats, and transforms the message into a number of other financial message formats, as specified in the packet sent over the network 102. In addition to returning the transformed message, the TaaS 103 returns a token to address the message, and saves the message so that it can be retrieved using the token. The TaaS 103 also implements an access control scheme where it allows various levels of access to portions of the stored message depending on the permissions.

In one embodiment, the message is sent using HTTP POST and retrieved using HTTP GET commands. For instance, a post message could be formatted similarly to Table 1:

TABLE 1

| COMMAND | SUBCOMMAND | PARAMETER | REQ'D |
|---------|------------|-----------|-------|
| POST | /TRANSFORM | PAYLOAD: <financial message> | YES |
| | | HEADER: <SWIFT MT header> | NO |
| | | TYPE: <message type> | NO |
| | | SOURCEVERSION: <source message format version> | NO |

TABLE 1-continued

| COMMAND | SUBCOMMAND | PARAMETER | REQ'D |
|---------|------------|-----------|-------|
|  |  | TARGETVERSION: <target message format version> | NO |
|  |  | RULEBOOK: <Nacha, Targe2, CPBR+ (Swift Cross Border), HVPS+ (High Value Payment Rule Book) Hong Kong, EBA Step 2> | NO |
|  |  | WITHVALIDATION: <yes/no> | NO |
|  |  | WITHSTORAGE: <yes/no> | NO |
|  |  | PERMISSIONS: <access permissions> | NO |
|  |  | CUSTOMTRANSFORM: <specific fields> | NO |
| GET | /TRANSFORM | MESSAGEID: <Id number returned from a POST command> | YES |
| POST | /VALIDATE | MESSAGEID: <Id number returned from a POST command> | YES |

In Table 1, the POST/TRANSFORM command returns a message ID and a transformed message via an HTTP/1.1 200 OK message. The GET/TRANSFORM message returns a portion or all of the transformed message, depending on the permissions granted to the requestor. The permissions could be set via a parameter in the message, or could be pre-configured either by the financial institution 101 who requested the transformation or by the institution sending the GET. In some situations, the institution sending the GET may not want additional information even if the permissions were granted (liability reasons, for instance). The POST/VALIDATE returns, via the HTTP/1.1 200 OK message, the original message and the transformed message, along with notes on any errors identified.

Figure 2:
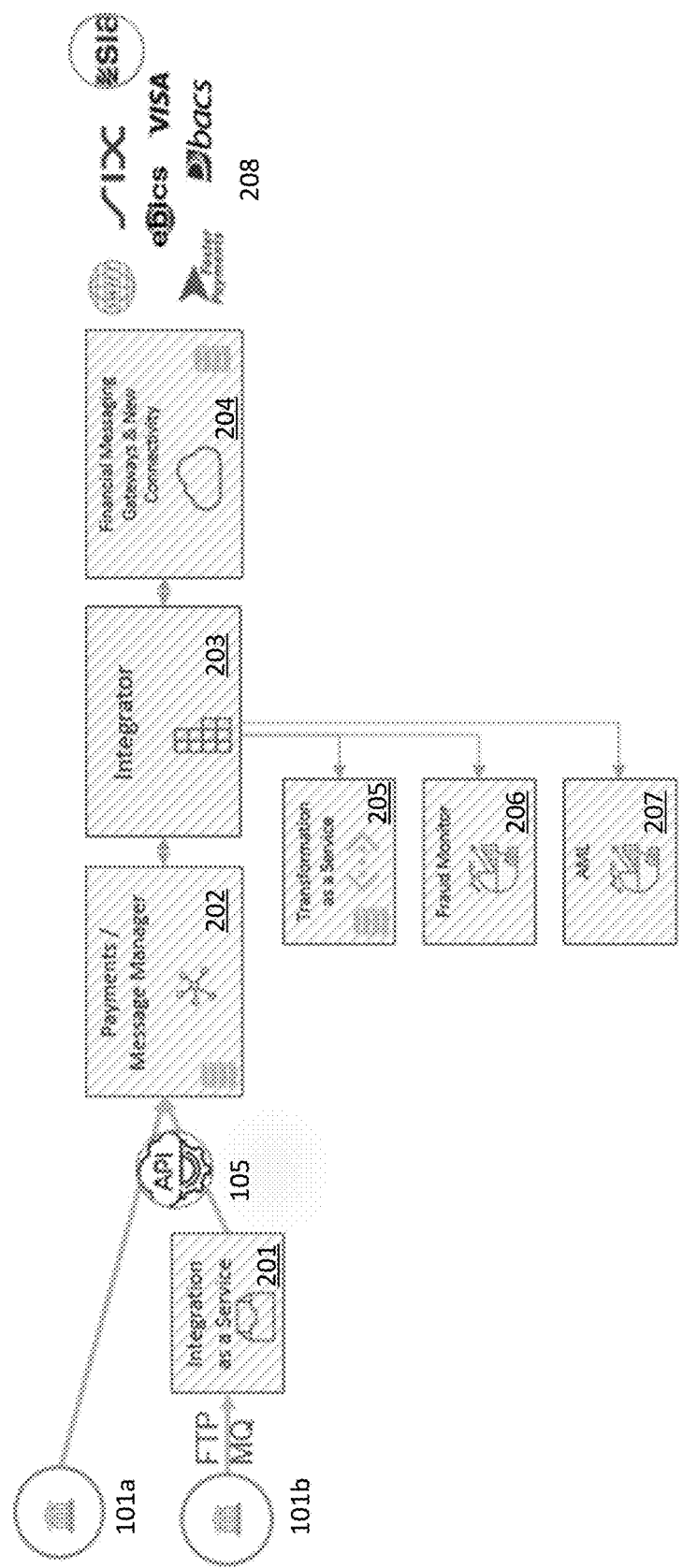
FIG. 2 is a message flow chart showing path of messages through the transformation system.

Looking to FIG. 2, there is a diagram of transformed message in a system. The financial institution 101a could directly send a message to a payment/message manager 202. Alternatively, a financial institution 101b could send a message through an integration as a service 201 application. The integration as a service (IaaS) 201 is a cloud-based delivery model that strives to connect on-premise data with data located in cloud-based applications. This paradigm facilitates real-time exchange of data and programs among enterprise-wide systems and trading partners. Either directly or through IaaS 201, the financial institution 101a, 101b use the API 105 to access the payments/message manager 202. The payments/message manager 202 decides what to call according what the customer subscribed, the country, what the network accepts, and other parameters. The payments/message manager 202 call the integrator 203. Integrator 203 is a technical component that help the financial institution 101a, 101b to connect to other services, such as transformation-as-a-service 205, fraud monitor 206, and the anti-money laundering (AML) sanctions monitor 207. The integrator 203 then passes the message off to the financial messaging gateway and new connectivity 204 to put the message on to a SWIFT, VISA, ACH, RTP, Bacs, ebics, Six, Esia, or Faster Payments banking (or payment) rail 208.

The integrator 203 takes the financial message and determines what format it is in and what format the destination payment rail requires. The integrator 203, in this embodiment, sends the message to the TaaS 205 service that converts the message to a transformed message and into a token. The TaaS 205 sever stores the message, allowing other services to access the message via the token. In this embodiment, the integrator 203 sends the token to the fraud monitor 206 and the sanctions monitor 207. The fraud monitor 206 receives the token, and requests a partial message from the TaaS 205 service, via the token. The TaaS 205 service returns only the message information needed by the fraud monitor, possibly only the identities of the sender and the receiver. The fraud monitor 206 has no need to know the amount of the transaction, nor the specific security being transferred (could be currency, bonds, stocks, loans, or other types of securities). The fraud monitor 206 then checks the message to see if the sender or receiver are on fraud watch lists and for any other indications of fraudulent activity. If so, a warning is sent to the integrator 203 to reject the message. Otherwise, the integrator 203 sends the token to the AML sanctions monitor 207, which queries the TaaS 205 service for the fields that it needs, using the token. If the message passes sanctions, it is sent on by the integrator 203 to the financial messaging gateway 204.

Figure 3:
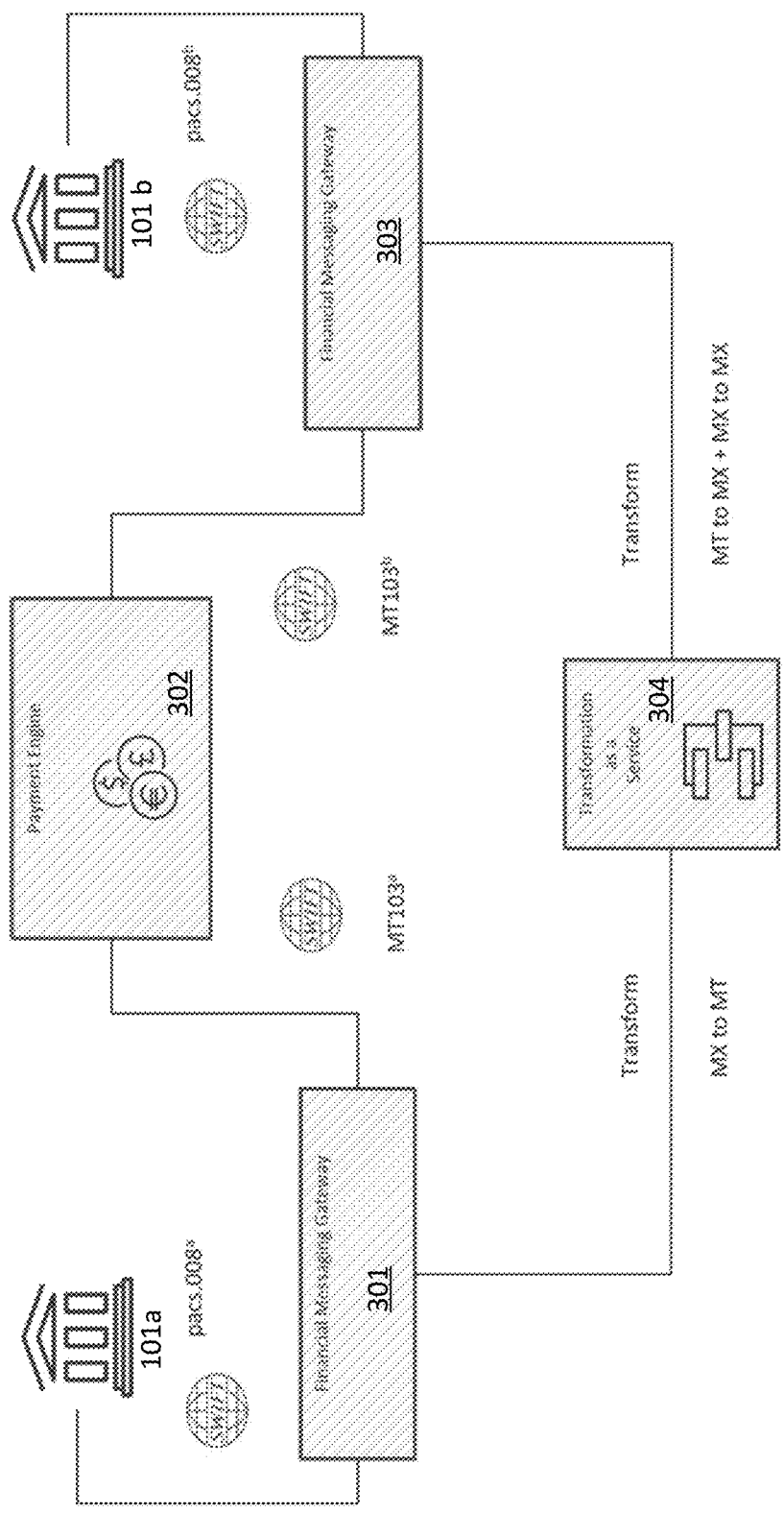
FIG. 3 is a flow chart of the end-to-end payment message transmission.

FIG. 3 shows an example of correspondent banking using transformation-as-a-service. In this scenario, the customer does not want to change any legacy banking software, but needs to use new formatting to pass the messages through the banking rails. The bank 101a sends a message using SWIFT or ISO 20022 (pacs.008 or pacs.009, for example) to the financial messaging gateway 301. The financial messaging gateway 301 determines if the message can be sent through traditional channels using the payment engine 302 to the financial messaging gateway 303 for the receiving bank 101b. If traditional channels will not work because the banking rails require different formatting, then the financial messaging gateway 301 sends the message to the TaaS 304 service, where the message is transformed into the appropriate message format. In this example, the message is transformed from MX (SWIFT) to MT (ISO 20022) format, and sent to the financial messaging gateway 303. The financial messaging gateway 303 calls on the TaaS 304 server to transform the message from MT format back into MX format, so that the legacy software in the receiving financial institution 101b can process the financial message. Note that TaaS 304 can transform messages in both directions. If the TaaS 304 sever stores the original and transformed messages, then any truncated information is stored and still accessible.

Figure 4:
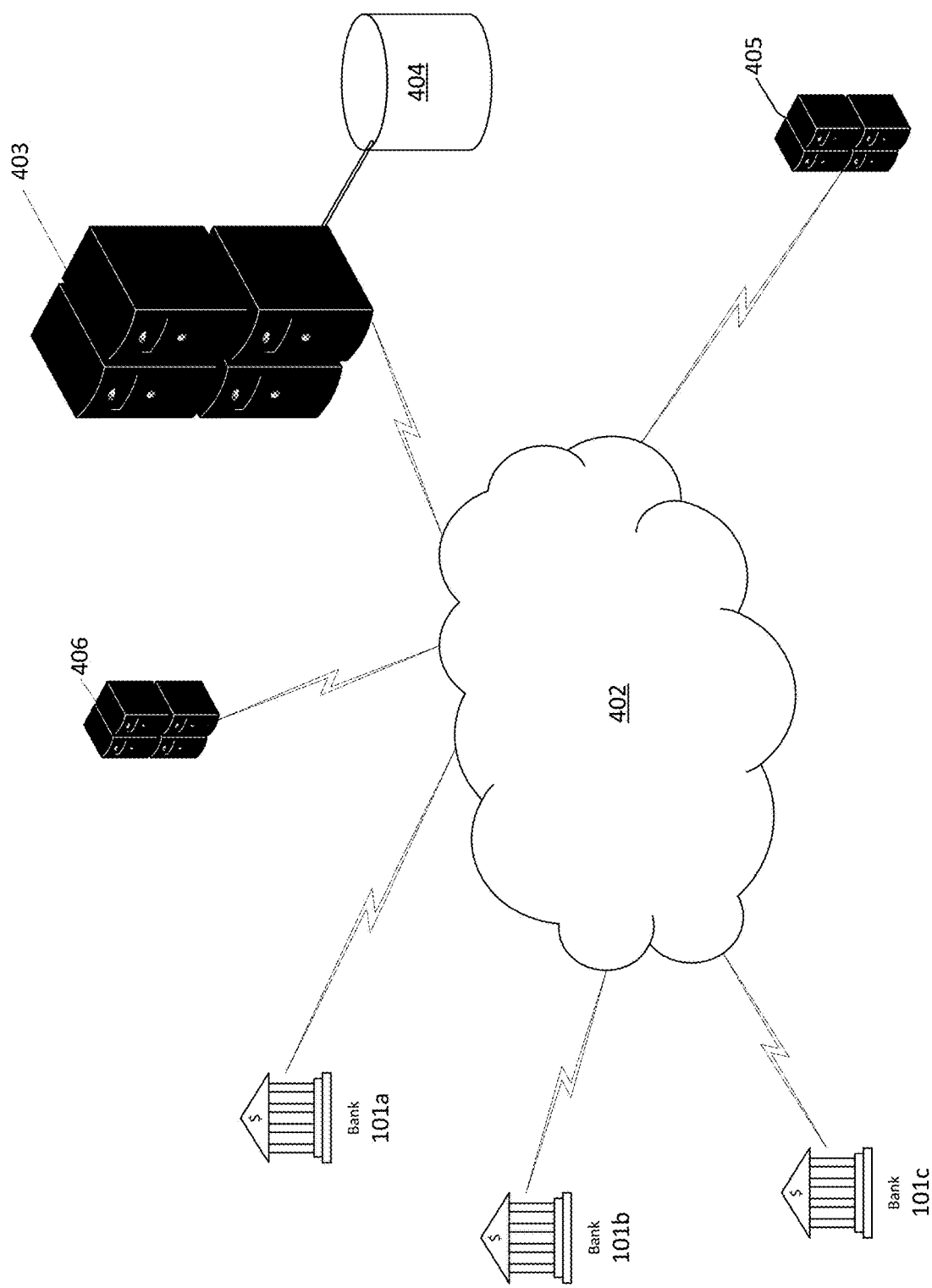
FIG. 4 is an electrical architecture of one embodiment of the system.

FIG. 4 shows the electrical system architecture. There are a number of financial institutions 101a, 101b, 101c connected to the cloud 402 (the cloud could be the internet, a local area network, a private network, a virtual private network, etc.). In most embodiments, the cloud 402 uses a secure channel between each of the connected items 101a, 101b, 101c, 403, 405, 406. The special purpose transformation-as-a-service server 403 is a high performance computing device with a plurality of processing cores for handling the volume of transformations that are requested from multiple clients. The TaaS server 403 transforms the financial messages sent to it from the financial institutions 101a, 101b, 101c into different financial messaging formats and returns the transformed messages. The TaaS server 403 is connected, electrically, wirelessly, or optically to the cloud 402 through a network interface and to a high performance, high capacity data storage device 404. The data storage device 404 stores the transformed messages for future retrieval via tokens.

The financial institutions 101a, 101b, 101c are connected, electrically, wirelessly, or optically to the cloud 402. The financial institutions 101a, 101b, 101c send messages to the TaaS server 403, the fraud monitoring server 406 and the AML sanctions server 405 for processing. The fraud monitoring server 406 and the AML sanctions server 405 are connected, electrically, wirelessly, or optically to the cloud 402.

Figure 5:
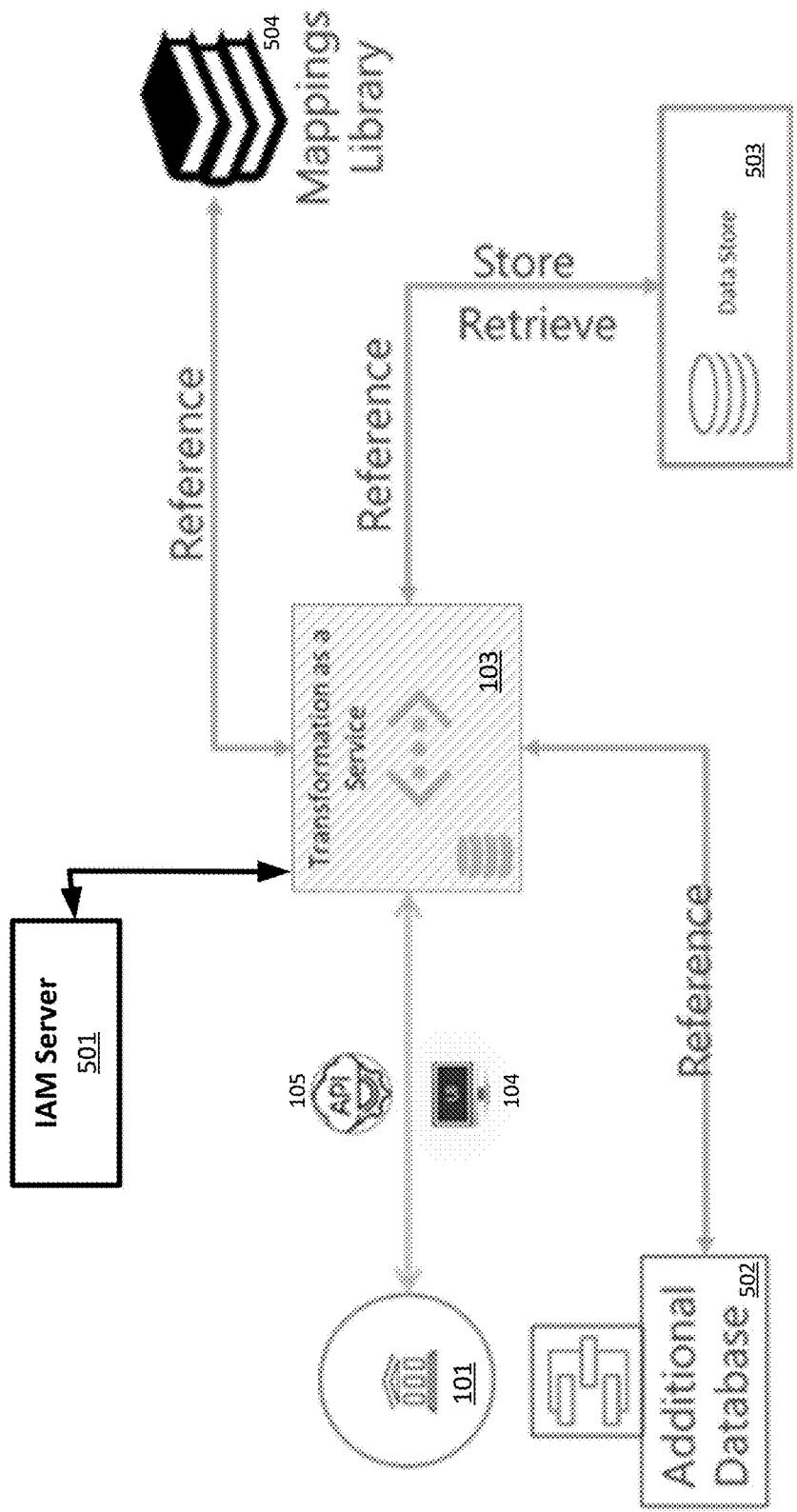
FIG. 5 is a diagram of the internal functionality of the transformation-as-a-service functionality.

FIG. 5 shows how the transformation-as-a-service 103 server operates from a functional standpoint. With a transformation request (POST/TRANSFORM), a financial institution 101 interacts with the TaaS 103 server through an API 105 or through a user interface 104. Upon each access, the identity and access management (IAM) 501 module accesses the request to see if there are sufficient rights to perform the function, and if so, what information can be provided. This IAM 501 can also be used to assure that the requestor has paid for the service.

Identity and access management (IAM) 501 is a framework for business processes that facilitates the management of electronic or digital identities. The framework includes the organizational policies for managing digital identity as well as the technologies needed to support identity management.

With the IAM 501 technology, information technology managers can control user access to critical information within the data store 503 (stored on the data storage device 404). Identity and access management products offer role-based access control (RBAC), which lets system administrators regulate access to systems or networks based on the roles of individual users within the enterprise.

In this context, access is the ability of financial institution 101 to perform a specific task, such as view, create or modify the message packet. Roles are defined according to authority within the financial network.

Systems used for identity and access management include single sign-on systems, multifactor authentication and access management, depending on the embodiment. These technologies also provide the ability to securely store identity and profile data as well as data governance functions to ensure that only data that is necessary and relevant is shared.

When the message is ready for the transformation, the TaaS 103 parses the message, determining what transformation pair is required. The original message is stored in the data store 503, and the original message is parsed. The TaaS 103 then maps each field using the mappings library 504. In some cases, the fields may be truncated because the destination format has fewer characters for a field, or a field is not present in the destination format. This is why the original message is stored, so the truncated information can be referenced in the future.

In other cases, required fields need information that is not present in the original message. Additional database 502 is referenced to find this information, if the fields are configured. For instance, once financial institution 101 may store its SWIFT code in the additional database 502, so that a message being transformed into SWIFT format will have the SWIFT bank code to use.

Once the transformation has occurred, the transformed message is also stored in the data store 503, and a token is generated to reference the original and transformed messages. The transformed message and the token are then returned to the financial institution 101.

If the financial institution 101 or another service wants to access the data store using the token (GET/TRANSFORM), the token is sent from the user interface 104 or through the API 105 to the TaaS 103 server. The TaaS 103 server checks for permissions using the IAM Server 501 to determine if the financial institution 101 has permission to access the messages point to by the token, and if so, which fields permission is granted to access. For instance, if the service requesting the message is an AML sanctions screening service, the IAM Server 501 will restrict access to the identity of the sender and receiver of the funds. In this example, the original message may have more information than the transformed message, so the sender and receiver from both messages are returned to the AML sanctions service, but not the amount or the type of security.

The foregoing devices and operations, including their implementation, will be familiar to, and understood by, those having ordinary skill in the art. This algorithm is necessarily rooted in computer technology in order to overcome the problem of displaying machine learning reasoning with a simple interface in order to receive user feedback in the machine's determination of a confidence score.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A system for transforming financial messages, the system comprising:
a financial institution, electrically connected to a cloud, the financial institution configured to create and send a POST/TRANSFORM HTTP message containing a financial message to a special purpose transformation-as-a-service server via the cloud, the POST/TRANSFORM HTTP message being an HTTP POST message that includes a /TRANSFORM subcommand;
a fraud monitor, electrically connected to the cloud, the fraud monitor configured to:
accept a message from the cloud,
check the message for fraudulent activity, and
return an indication of fraud;
a sanctions monitor electrically connected to the cloud, the sanctions monitor configured to:
accept a sanctions message from the financial institution via the cloud, said message containing a token,
interrogate the special purpose transformation-as-a-service server for a portion of the transformed message,
check the portion of the transformed message for sanctioned activity, and
return a sanction indication to the financial institution; and
the special purpose transformation-as-a-service server, the special purpose transformation-as-a-service server comprising:
a plurality of processing cores electrically connected;
a data storage device electrically connected to the plurality of processing cores; and
a network interface electrically connected to the plurality of processing cores and to the cloud, the special purpose transformation-as-a-service server accessible to the financial institution and the fraud monitor through the cloud, the plurality of processing cores configured to:
accept the POST/TRANSFORM HTTP message containing the financial message from the financial institution,
determine if the financial institution has permission to perform a service requested in the financial message, store the financial message in the data storage device, parse the financial message into fields and data, transform the financial message into a transformed message that contains at least a portion of the data from the financial message, using a mappings library on the fields, store the transformed message in the data storage device, generate the token related to the transformed message and the financial message, and return the token and the transformed message to the financial institution in response to the POST/TRANSFORM HTTP message;

the financial institution configured to send the token to the fraud monitor, the fraud monitor configured to send the token in a GET/TRANSFORM HTTP message to the special purpose transformation-as-a-service server, and the special purpose transformation-as-a-service server configured to return a portion of the transformed message to the fraud monitor in response to the GET/TRANSFORM HTTP message which evaluates the portion of the transformed message and returns the indication of the fraud to the financial institution.

2. The system of claim 1 wherein the financial message transformation further includes using an additional database.

3. The system of claim 1 wherein the financial institution is a bank.

4. The system of claim 1 wherein the financial message is in SWIFT format.

5. The system of claim 1 wherein the transformed message is in ISO 20022 format.

6. A special purpose transformation-as-a-service server, the special purpose transformation-as-a-service server comprising:

a plurality of processing cores electrically connected;

a data storage device electrically connected to the plurality of processing cores; and a network interface electrically connected to the plurality of processing cores and to a cloud, the special purpose transformation-as-a-service server accessible to a financial institution, and a sanctions monitor through the cloud, the plurality of processing cores configured to:
accept a POST/TRANSFORM HTTP message containing a financial message from the financial institution,
determine if the financial institution has permission to perform a service requested in the financial message by querying an identity and access management module,
store the financial message in the data storage device,
transform the financial message into a transformed message by parsing the financial message into fields and data, using a mappings library on the fields, reassembling the fields and at least a portion of the data from the financial message into the transformed message,
store the transformed message in the data storage device,
generate a token related to the transformed message and the financial message, and
return the token and the transformed message to the financial institution in response to the POST/TRANSFORM HTTP message, the POST/TRANSFORM HTTP message being an HTTP POST message that includes a /TRANSFORM subcommand, the plurality of processing cores configured to:
accept a sanction message from the sanctions monitor via the cloud, said sanction message containing the token,
interrogate the identity and access management module for access rights to portions of the transformed message,
retrieve the portions of the transformed message, and
return the portions of the transformed message to the sanctions monitor so that the sanctions monitor may check for sanctioned activity.

7. The special purpose transformation-as-a-service server of claim 6 wherein the financial message transformation further includes using an additional database.

8. The special purpose transformation-as-a-service server of claim 6 wherein the financial institution is a bank.

9. The special purpose transformation-as-a-service server of claim 6 wherein the financial message is in SWIFT format.

10. The special purpose transformation-as-a-service server of claim 6 wherein the transformed message is in ISO 20022 format.

11. A method for transforming financial messages, the method comprising:

receiving a POST/TRANSFORM HTTP message containing a financial message from a financial institution on a cloud, at a network interface electrically connected to the cloud and a plurality of processing cores, the POST/TRANSFORM HTTP message being an HTTP POST message that includes a /TRANSFORM subcommand;

determining if the financial institution has permission to perform a service requested in the financial message by querying an identity and access management module, storing the financial message in a data storage device electrically connected to the plurality of processing cores;

transforming the financial message into a transformed message by parsing the financial message into fields and data, using a mappings library on the fields, reassembling the fields and at least a portion of the data from the financial message into the transformed message;

storing the transformed message in the data storage device;

generating a token related to the transformed message and the financial message;

returning the token and the transformed message to the financial institution in response to the POST/TRANSFORM HTTP message;

accepting a sanction message from a sanctions monitor via the cloud, said sanction message containing the token;

interrogating the identity and access management module for access rights to portions of the transformed message;

retrieving the portions of the transformed message; and returning the portions of the transformed message to the sanctions monitor for checking for sanctioned activity.

12. The method of claim 11 further comprising accepting, by the plurality of processing cores, a fraud monitor message from the financial institution via the cloud, said fraud monitor message containing the token;

interrogating the fraud monitor message, by the identity and access management module, for access rights to portions of the transformed message retrieving the portions of the transformed message; and returning the portions of the transformed message.

13. The method of claim 11 wherein the financial institution is a bank.

14. The method of claim 11 wherein the financial message is in SWIFT format.

15. The method of claim 11 wherein the transformed message is in ISO 20022 format.

* * * * *